3,454,355
METHOD OF REMOVING SULFUR DIOXIDE AND NITROGEN OXIDES FROM GASES
Porter Raymond Ryason, San Anselmo, Calif., assignor to Chevron Research Company, San Francisco, Calif., a corporation of Delaware
No Drawing. Filed May 20, 1966, Ser. No. 551,523
Int. Cl. B01d 49/00; B01j 11/22; C01b 17/56
U.S. Cl. 23—2                                                      6 Claims

ABSTRACT OF THE DISCLOSURE

Method of removing sulfur dioxide and nitrogen oxides from gaseous mixtures which comprises contacting said gaseous mixture at a temperature of at least 750° F. with a catalyst selected from the group consisting of copper, silver, nickel, molybdenum, palladium and cobalt or alumina in the presence of carbon monoxide in an amount at least .75 of the stoichiometric amount necessary to reduce the sulfur dioxide and other oxidizing gases in said gaseous mixture.

---

This invention concerns a novel method for removing noxious, offensive gases from flue gases. More particularly, this invention concerns a novel method for catalytically reducing noxious and offensive gases to innocuous or collectable products.

Large amounts of sulfur dioxide and nitrogen oxides are produced each year as waste products: emission of sulfur dioxide alone is estimated at 21 million tons each year in the United States from the combustion of fuel, oil and coal. A major source of the sulfur dioxide is the combustion of coal and petroleum in the generation of power. Efficient inexpensive removal of sulfur from fuel has not been achieved and numerous efforts have been directed toward removing the sulfur dioxide from the flue gas. Some methods have relied on the oxidation of sulfur dioxide to sulfur trioxide which can then be used to produce sulfuric acid. Alternatively, other methods have relied on adsorbence to adsorb the $SO_2$ and carry the adsorbed $SO_2$ to an area where it may be reduced to sulfur.

Nitrogen oxides also occur in flue gases. These oxides are significant contributors to smog formation.

In any catalytic process for removal of noxious gases, the demands on the catalyst are manifold. The process must be extremely efficient at high space rates and low concentrations of the noxious gases. Moreover, the catalyst must have a relatively long lifetime, without losing a significant degree of activity. During the process, significant cooling of the exhaust gases should be avoided. Otherwise, the cooled gases lose their buoyancy and descend in the neighborhood of the stack. Unless complete removal of the noxious gases is effected, a greater local awareness of the presence of the noxious gases occurs than before the method of removal was initiated.

It has now been found that noxious and offensive gases—sulfur dioxide ($SO_2$) and nitrogen oxides ($NO_x$)—may be effectively removed from flue gases which are relatively free of particulate matter, by contacting the flue gas at a temperature of at least about 750° F., for a contact time of at least about 0.1 second, with a heavy metal catalyst on an alumina support, wherein the flue gas contains at least about 0.75 molecule of carbon monoxide (CO) for each oxygen atom present in $SO_2$ or $NO_x$. If $O_2$ is present in the flue gas, the amount of CO must be increased by that amount which will react with the $O_2$ to form $CO_2$ The fuel is burned incompletely so as to provide sufficient carbon monoxide to reduce all or almost all of the sulfur and nitrogen oxides present. After the flue gases have left the furnace area, any flyash or particulate matter is removed. The temperature of the flue gas should be at approximately the temperature of the catalyst zone. The catalyst is in the form of pellets, the pellet size depending on the height or width of the catalyst zone and the flue gas velocity.

The sulfur that is formed, sulfur dioxide being the major reactant, can be collected by mechanical or other means. In the presence of large excesses of carbon monoxide, the sulfur and carbon monoxide will react to form carbon oxysulfide. The nitrogen oxides will be reduced to nitrogen which may be vented with the other innocuous gases.

The metal catalysts used on the alumina support are copper, silver, nickel, molybdenum, palladium and cobalt, with the preferred catalyst being metals of Group 1–B, particularly of atomic number 29 to 47, i.e., copper and silver. The metals may be used individually or in combination.

The catalysts are readily prepared by adding high surface area alumina pellets to an aqueous solution of a water soluble metal salt, separating the alumina pellets from the water and then drying. In some instances, it may be preferable to heat the water-pellet mixture, usually 30 to 60 minutes being satisfactory, at the reflux temperature of the water. Generally, the metal will be adsorbed in amounts of about 0.2 to 2 weight percent of the alumina, more usually about 0.5 to 1.5 weight percent. Above the minimum amount, the weight percent of metal is not critical. Larger amounts may be used, if desired.

Optionally, the catalyst (metal cation adsorbed on alumina) may be treated with hydrogen prior to use, reducing the metal cation to the metal. The hydrogen pretreatment is carried out as follows: the dried catalyst is heated to a temperature of about 900° to 1,200° F. and maintained in a hydrogen environment at that temperature for about one-half to two hours.

The alumina pellets are activated alumina having high surface area, usually in excess of 100 sq. mm./gm. The alumina is of the type normally used as a catalyst support. Depending on the height of the catalyst bed, the size of the individual pellets will vary, the smaller pellets being used for the shorter beds to minimize channeling. The pellet size will generally be from about 1 to 80 cu. mm. external surface area, usually in the shape of spheres or cylinders.

The temperature at which the catalyzed reaction of the $SO_2$ or $NO_x$ with CO occurs is generally at least about 750° F. and more usually in the range of about 900° F. to 1,500° F., preferably about 1,000° F. to 1,200 F.

The contact times will generally be at least about 0.1 second and more usually from about 0.2 second to 5 seconds, preferably from about 0.2 second to 0.5 second. Space rates of the order of 10,000 vol./vol./hr. or higher may be achieved without diminution of the efficiency of the process.

As already indicated, excess carbon monoxide will react with sulfur to form carbon oxysulfide. Therefore, the amount of carbon monoxide produced is critical in determining the products obtained. In some instances it may be desired to minimize carbon oxysulfide formation at the expense of incomplete reduction of the sulfur and nitrogen oxides. As is evident from the following equations,

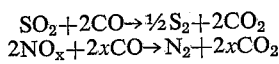

one molecule of carbon monoxide is necessary for each atom of oxygen present as sulfur or nitrogen oxide. As sulfur is formed, the reaction

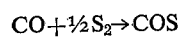

occurs. Therefore, since the amounts of sulfur dioxide and nitrogen oxides are fixed by the combustion, control of the oxygen used in the combustion controls the amount of carbon monoxide and ultimately the products of the catalytic reduction. Depending on the needs of the particular situation, as little as 75% of the stoichiometric requirement of carbon monoxide may be produced or as much as three times the stoichiometric requirement will be present. Usually, about 0.8 to 2 times the stoichiometric requirement of carbon monoxide will be formed.

The partial pressure or concentration of sulfur dioxide in flue gases will, of course, vary with the sulfur content of the fuel. In most flue gases, sulfur dioxide will be present in from about 0.05 to less than 1%. The nitrogen oxides will generally be in much lower concentration than $SO_2$, usually 0.01 to 0.1%. By controlling the amount of The cobalt catalyst was prepared by adding 50 g. of Nalco alumina extrudate (8–14 Tyler mesh) to a hot solution of 25 g. of $CO(NO_3)_2 6H_2O$ in 200 ml. distilled water. After standing about 48 hours, the excess liquid was filtered off and the solid dried on a hot plate.

The following table demonstrates the reduction of $SO_2$, indicates the conditions under which the runs were carried out, the compositions of the gas introduced and the percent reduction of the sulfur dioxide. Analysis for sulfur dioxide was carried out by the West-Gaeke colorimetric method (Anal. Chem. 28, 1816 (1965)). Carbon monoxide was determined by nondispersive infrared, Beckman Model 28. Carbon dioxide was determined in the same manner.

The temperature of the catalyst was maintained at 1,000° F.

TABLE I

| Catalyst | Form [1] | $H_2$ [2] pretreatment | Bed depth, cm. | Initial concentrations, percent [3] | | | Flow data | | Average percent reduction |
|---|---|---|---|---|---|---|---|---|---|
| | | | | $SO_2$ | CO | $CO_2$ | Space rate, min.$^{-1}$ | Residence time, sec. | |
| Copper | B | Yes | 1 | 0.5 | 2.0 | 10 | 64.2 | 0.935 | 99 |
| | | | | | | | 107 | 0.561 | 99 |
| | | | | | | | 171 | 0.351 | 97 |
| Silver | B | Yes | 1 | 0.5 | 2.0 | 10 | 64.2 | 0.935 | 96.5 |
| | | | | | | | 107 | 0.561 | 94.3 |
| | | | | | | | 171 | 0.351 | 97.0 |
| Nickel-molybdenum [4] | A | No | 1 | 0.5 | 2.0 | 10 | 64.2 | 0.935 | 97 |
| | | | | | | | 107 | 0.561 | 94 |
| | | | | | | | 171 | 0.351 | 96 |
| Palladium | A | No | 6 | 0.5 | 2.0 | 10 | 10.7 | 5.61 | 93 |
| | | | | | | | 17.8 | 3.37 | 94 |
| | | | | | | | 28.6 | 2.10 | 95 |
| Cobalt | B | Yes | 2 | 0.67 | 1.33 | 6.7 | 39.5 | 1.52 | 92 |
| | | | | 0.5 | 2 | 10 | 39.5 | 1.52 | 99 |
| | | | | | | | 105 | 0.572 | 99 |

[1] A—Pellets, 3 mm. dia.; 4 mm. long; B—8–14 Tyler mesh.
[2] The catalyst was maintained at 1,000° F., while passing $H_2$ gas over it for about ¾ to 1 hour.
[3] The remainder is nitrogen.
[4] Commercial hydrofining catalyst.

carbon monoxide produced, one can isolate the sulfur produced or produce carbonyl sulfide which may be treated as desired.

In order to demonstrate the effectiveness of this process, an apparatus was set up as follows. Supplies of carbon monoxide, sulfur dioxide, and nitrogen were provided which could be carefully metered into the reduction zone. The reduction zone comprised a vertically situated tube having an inlet port and an outlet port with sampling ports adjacent to the inlet and outlet ports. The tube was fitted with a heating jacket. In the lower portion of the tube was a coarse silica gel (grade 70) column 11 cms. in height which served as a preheater to bring the gas mixture to the desired temperature. On top of the silica gel was a thin band of the candidate catalyst and then a further band of 11 cms. of the previously described silica gel. The gases entering and leaving the reaction zone were analyzed for sulfur dioxide, carbon monoxide and carbon dioxide. The runs were carried out for 8 to 40 hours' time with from 12 to 60 determinations made.

Catalysts were prepared as follows:

The copper catalyst was prepared by adding 50 g. of Nalco alumina extrudate (8–14 Tyler mesh particles) to a solution of 5.09 g. of copper nitrate trihydrate in 100 ml. of water. The amounts of materials used were based on obtaining 1 weight percent of metal determined from the pore volume quoted for the catalyst. The mixture was heated on a steam plate for 40 minutes. After cooling, the excess liquid was filtered off and the extrudate dried at 100° C.

The silver catalyst was prepared by adding 100 g. of Nalco alumina extrudate (8–14 Tyler mesh particles) to a solution of 5.28 g. of silver nitrate in 250 ml. of water. After filtering off the excess solution, the impregnated catalyst was dried at 100° C.

The palladium catalyst was obtained commercially from Engelhard Industries. The palladium (0.5 weight percent) is supported on alumina pellets, approximately 3 mm. in diameter and 4 mm. in length.

In order to demonstrate the effectiveness of the process of this invention in removing both sulfur dioxide and nitrogen oxide, synthetic gas mixtures were prepared and introduced into the apparatus previously described. The temperature used was 1,000° F. and the copper on alumina catalyst used was hydrogen pretreated by heating at 1,000° F. for 45 minutes in a hydrogen atmosphere. The catalyst bed depth was 1.5 cm. The following table indicates the results, at each space rate a number of results being reported.

TABLE II

| Space rate (min.$^{-1}$) | Residence time (sec.) | Percent $SO_2$ reduction | Percent $NO_x$ reduction |
|---|---|---|---|
| (a) Initial composition of 0.47% $SO_2$, 1.3% CO, 8% $CO_2$, 125 p.p.m. $NO_x$ | | | |
| 52.5 | 1.14 | >99 | 100 |
| | | >99 | 100 |
| | | >99 | 100 |
| | | >99 | 100 |
| 105 | 0.571 | 80 | 100 |
| | | 88 | 100 |
| | | 98 | 100 |
| | | >99 | 100 |
| | | 97 | 100 |
| | | 97 | |
| 131 | 0.457 | 98 | 93 |
| | | 98 | 93 |
| | | 98 | 100 |
| | | 97 | 100 |
| | | 98 | |
| (b) Initial composition 0.47% $SO_2$, 0.97% CO, 5.8% $CO_2$, ~166 p.p.m. $NO_x$ | | | |
| 105 | 0.571 | 96 | 100 |
| | | 95 | 100 |

It is evident from the above data that the process of this invention is extremely effective in the removal of offensive gases: with removing sulfur dioxide, a useful isolatable product—sulfur—is formed. The removal of the offensive gases significantly reduces the amount of pollution in the atmosphere. Also, the process introduces no significant reduction of the temperature of the flue gas, thus preventing the descending of the flue gas in the neighborhood of the flue. The method of this invention can be used with any flue gas which has at least about 0.05% sulfur dioxide and wherein approximately twice the concentration of carbon monoxide may be produced of the sulfur dioxide present. The process is also effective with higher oxides of sulfur, i.e., sulfur trioxides, to produce sulfur.

As will be evident to those skilled in the art, various modifications on this invention can be made or followed, in the light of the foregoing disclosure and discussion, without departing from the spirit or scope of the disclosure or from the scope of the following claims.

I claim:
1. A method for removing from flue gases at elevated temperatures sulfur dioxide and nitrogen oxides which comprises contacting said flue gases at a temperature of at least about 750° F. for a contact time of at least about 0.1 second with a member selected from the group consisting of copper, silver, nickel, molybdenum, palladium and cobalt catalyst on alumina support in the presence of carbon monoxide which is present in at least 0.75 of the stoichiometric amount, necessary to reduce sulfur dioxide and other oxidizing gases in said flue gas.
2. A method according to claim 1, wherein said metal is present in from 0.2 to 2 weight percent of the alumina.
3. A method according to claim 1, wherein said temperature is in the range of 1,000° to 1,200° F.
4. A method according to claim 1, wherein said catalyst is copper.
5. A method according to claim 1, wherein the catalyst is pretreated with hydrogen by heating at 1,000° F. for at least about 15 minutes prior to use as a catalyst.
6. A method according to claim 1, wherein carbon monoxide is present in from about 0.8 of stoichiometric to the stoichiometric amount.

References Cited
UNITED STATES PATENTS

| | | | |
|---|---|---|---|
| 2,090,828 | 8/1937 | Beckman | 23—2 |
| 2,747,968 | 5/1956 | Pigache | 23—178 |
| 2,924,504 | 2/1960 | Reitmeier | 23—2 |
| 2,970,034 | 1/1961 | Anderson et al. | 23—2 |

OSCAR R. VERTIZ, Primary Examiner.

E. C. THOMAS, Assistant Examiner.

U.S. Cl. X.R.

23—178, 203, 226